(12) United States Patent
Blazic

(10) Patent No.: US 8,308,149 B2
(45) Date of Patent: Nov. 13, 2012

(54) SHOCK AND VIBRATION ISOLATION FOR AIRCRAFT BRAKE CONTROL VALVE

(75) Inventor: Ernest Blazic, Agoura Hills, CA (US)

(73) Assignee: Hydro-Alre, Inc., Burbank, CA (US)

( * ) Notice: Subject to any disclaimer, the term of this patent is extended or adjusted under 35 U.S.C. 154(b) by 661 days.

(21) Appl. No.: 12/496,557

(22) Filed: Jul. 1, 2009

(65) Prior Publication Data

US 2010/0258989 A1      Oct. 14, 2010

Related U.S. Application Data

(63) Continuation-in-part of application No. 12/422,923, filed on Apr. 13, 2009, now Pat. No. 8,136,894.

(51) Int. Cl.
*F16F 7/00* (2006.01)
(52) U.S. Cl. ............... 267/141; 267/293; 303/119.3; 248/635; 248/638
(58) Field of Classification Search .......... 267/141, 267/153, 292, 293; 303/119.2, 119.3; 248/634, 248/635, 636–638; 307/9.1, 10.1
See application file for complete search history.

(56) References Cited

U.S. PATENT DOCUMENTS

| | | | |
|---|---|---|---|
| 2,477,972 A | 8/1945 | Efromson et al. | |
| 2,616,641 A | 5/1946 | Gagen | |
| 2,658,710 A | 5/1950 | Titus | |
| 2,894,711 A | 5/1956 | Wingard et al. | |
| 3,245,727 A | 4/1966 | Anderson et al. | |
| 3,893,775 A * | 7/1975 | Sievers et al. | 403/225 |
| 4,738,435 A | 4/1988 | Flower et al. | |
| 5,110,081 A * | 5/1992 | Lang, Jr. | 248/635 |
| 5,255,764 A | 10/1993 | Kurabayashi et al. | |
| 5,286,014 A * | 2/1994 | Chakko | 267/293 |
| 5,558,191 A | 9/1996 | Lai | |
| 6,059,503 A * | 5/2000 | Johnson | 411/353 |
| 6,719,482 B2 * | 4/2004 | Morita | 403/408.1 |
| 6,755,205 B1 | 6/2004 | Hoemke et al. | |
| 6,820,908 B1 * | 11/2004 | Tousi et al. | 296/35.1 |
| 7,398,143 B2 | 7/2008 | Stothers et al. | |
| 7,552,902 B2 * | 6/2009 | Tsuge | 248/638 |
| 8,136,894 B2 * | 3/2012 | Blazic | 303/119.2 |

* cited by examiner

*Primary Examiner* — Pamela Rodriguez
(74) *Attorney, Agent, or Firm* — Fulwider Patton LLP

(57) ABSTRACT

The shock and vibration isolation system for hard mounting of a manifold of a brake control valve includes shock and vibration isolators that can be assembled in the mounting feet of the manifold of the brake control valve. The shock and vibration isolators have a pre-selected, predetermined natural frequency operative to protect components of the brake control valve from shock and vibration. Each of the shock and vibration isolators includes a radially inner generally spool shaped rigid insert portion and a radially outer generally spool shaped vibration insulating sheath portion.

21 Claims, 4 Drawing Sheets

SHOCK AND VIBRATION ISOLATION FOR AIRCRAFT BRAKE CONTROL VALVE

CROSS-REFERENCES TO RELATED APPLICATIONS

This application is a continuation-in-part of U.S. application Ser. No. 12/422,923, filed Apr. 13, 2009, which is incorporated by reference in its entirety.

BACKGROUND

This invention relates to generally to shock and vibration isolation for aircraft brake control valves, and more particularly relates to improved mounting of an electro-hydraulic brake control valve and a shock and vibration isolation system including shock and vibration isolators that can be used to isolate the mounting of the electro-hydraulic brake control valve from the undesirable effects of aircraft shock and vibration, and structural loads generated at the manifold mounting interface.

Conventional aircraft brake control valves are typically hard mounted by being bolted or otherwise rigidly secured by fasteners to a structural part or framework of the aircraft. However, some modern aircraft designs produce more severe random vibration environments than have been previously experienced that adversely affect the functioning of such hard mounted aircraft brake control valves. The problem is more acute with brake-by-wire aircraft brake control valves, because the brake control valves are typically operational for all braking functions, and are not just operational during a skid event.

For example, one type of brake control valve uses a pressure control valve with a flapper nozzle first stage that incorporates an armature that is essentially an undamped spring with a natural frequency in the 300 to 500 Hz range, depending on the armature spring rate. Vibration profiles at brake control valve mounting locations almost always contain this frequency, so that vibrations in this range will result in some degree of damage to the flapper nozzle as a result of motion of the undamped armature at its resonant frequency that can result in unsatisfactory performance or even failure of the brake control valves.

One known type of active/passive damping apparatus for large structures includes a passive type damping mechanism to be mounted on the structure, including an added mass, spring, and dampener. Hydraulic cylinders are mounted on the structure and connected to the added mass, with an electro-hydraulic servo mechanism to switch the hydraulic cylinders between passive and active type operation, and a control unit is provided for switching the electro-hydraulic servo mechanism between passive and active type operation in response to the velocity and displacement of the added mass as well as the velocity of the structure.

Another type of active vibration absorber is known for absorbing vibrations in a member that includes an inertial mass mounted on the member. A force actuator applies a force between the inertial mass and the member, and resonance of the active vibration absorber is damped. A first sensor provides a first signal indicative of at least one movement and/or stress related parameter for the member, and a second sensor provides a second signal indicative of a reaction of the inertial mass. A control unit is provided for controlling the force actuator arrangement using the first signal and the second signal.

A tuned mass damper is also known for damping dynamic response in a primary structure in one, two, or three dimensions. The tuned mass damper includes a secondary mass, a spring, and a viscoelastic element, with the spring and viscoelastic element interposed between the primary structure and the secondary mass.

A method is also known for stabilizing a nozzle flapper valve from oscillating, by adding an inertia tube to the flow path of the flapper valve nozzle, to effectively produce a stabilizing pressure force on the flapper at its natural frequency.

It would be desirable to provide a shock and vibration isolation mounting system for an aircraft brake control valve to allow the aircraft brake control valve to be mounted in environments that are often too severe for conventional hard mounted valve mounting arrangements. For example, it would be desirable to provide such a shock and vibration isolation mounting system to allow mounting of an aircraft brake control valve in a wheel well or near or on landing gear, due to their close proximity to brake pistons, allowing the use of shorter length hydraulic lines to provide faster system response and better system performance.

It also would be desirable to improve brake control valve reliability at conventional mounting locations where hard mounting of brake control valves has previously been used. It would also be desirable to provide a shock and vibration isolation mounting system that will allow the utilization of aircraft brake control valves having a less rigid valve structure as a result of lower stresses at the aircraft mounting interface, to provide weight savings in the mounting of brake control valves. In addition, it would be desirable to provide a shock and vibration isolation mounting system that will allow for brake control electronics that are typically isolated from shock and vibration to be co-located on shock and vibration isolated brake control valves to provide for improved signal processing and signal integrity due to close proximity of brake control electronics to a brake control valve and a wheel speed sensor. The present invention addresses these and other needs.

SUMMARY OF THE INVENTION

Briefly, and in general terms, the present invention provides a system for hard mounting of a manifold of a brake control valve by providing shock and vibration isolators to be used in mounting of the manifold of the brake control valve, wherein the shock and vibration isolators are operative to protect components of the brake control valve from shock, vibration and high pressure pulses that can occur in response to harmonic resonance of a component that can damage the component, such as a flapper valve of the brake control valve. The shock and vibration isolation mounting system of the invention allows the manifold of an aircraft brake control valve to be mounted in severe environments, such as in an aircraft wheel well, or on or near landing gear. The brake control valve shock and vibration isolation mounting system also allows for brake control electronics to be co-located on a shock and vibration isolated brake control valve manifold to provide for improved signal processing and signal integrity.

Accordingly, the present invention provides for a brake control valve shock and vibration isolation mounting system including a shock and vibration isolator that can be incorporated in mounting feet of an aircraft brake control valve manifold. The mounting feet of the brake control valve manifold typically have mounting apertures each configured to receive and retain a shock and vibration isolator. Each of the shock and vibration isolators has a natural frequency selected to protect components of a brake control valve from random vibration and to avoid gun fire sinusoidal frequencies that can otherwise damage components of the brake control valve. In particular, the natural frequency of the shock and vibration isolators is pre-selected and predetermined to be in a range to protect one or more components of a brake control valve, such as a flapper nozzle, for example, from random shocks and vibration and to avoid gun fire sinusoidal frequencies, and the pre-selected, predetermined natural frequency of the shock and vibration isolators is preferably below the natural frequency range of 300 to 500 Hz of the flapper nozzle of the brake control valve, such as approximately 75.5 Hz, for example.

In a presently preferred aspect, each of the generally tubular shock and vibration isolators includes a radially inner generally spool shaped rigid insert portion and a radially outer generally spool shaped vibration insulating sheath portion. Typically the radially inner generally spool shaped rigid insert portion is formed of a first or upper radially inner rigid tubular member and a second or lower radially inner rigid tubular member that overlaps and interfits with the first or upper radially inner rigid tubular member, and the radially outer generally spool shaped vibration insulating sheath portion is formed of a first or lower generally tubular radially outer vibration insulating sheath portion and a second or upper generally tubular radially outer vibration insulating sheath portion that overlaps and interfits with the first or lower generally tubular outer vibration insulating sheath portion. In a presently preferred aspect, each shock and vibration isolator has a radially outer diameter that is dimensioned such that a fastener placed through the central aperture of the rigid tubular insert portion will be spaced apart from the mounting foot in which the shock and vibration isolator is placed by the vibration insulating sheath portion or jacket, wherein vibrations transmitted through the fastener from the aircraft structural part will be substantially isolated from the mounting feet of the manifold of the brake control valve.

In another presently preferred aspect, the first or upper radially inner rigid tubular member of the radially inner generally spool shaped rigid insert portion includes an upper radially outwardly flared annular end portion and a lower tubular shaft portion, and the second or lower radially inner rigid tubular member of the radially inner generally spool shaped rigid insert portion includes a lower radially outwardly flared annular end portion and an upper flange that overlaps and interfits with the lower tubular shaft portion of the first or upper radially inner rigid tubular member. The first or upper radially inner rigid tubular member and the second or lower radially inner rigid tubular member of the generally spool shaped rigid insert portion together define a central aperture therethrough for receiving a fastener for hard mounting of the mounting feet of the brake control valve manifold to a structural part of the aircraft.

In another presently preferred aspect, the second or upper generally tubular radially outer vibration insulating sheath portion includes a radially outer tubular portion and a radially inner annular portion, and the first or lower generally tubular radially outer vibration insulating sheath portion includes a lower radially outwardly flared end portion with a lower lip portion that extends over the lower radially outwardly flared end portion of the second or lower radially inner rigid tubular member of the radially inner generally spool shaped rigid insert portion, and the first or lower generally tubular radially outer vibration insulating sheath portion includes an upper radially inner flange that is overlapped by and interfits with the radially inner annular portion of the second or upper generally tubular radially outer vibration insulating sheath portion. The first or lower generally tubular radially outer vibration insulating sheath portion is secured about the upper radially inner tubular shaft portion and lower radially outwardly flared annular end portion of the second tubular member of the generally spool shaped rigid insert portion, and the second or upper generally tubular radially outer vibration insulating sheath portion is secured about an upper radially outwardly flared annular end portion of the first or upper radially inner rigid tubular member.

In another presently preferred aspect, the first and second radially inner rigid tubular members forming the inner, generally spool shaped rigid insert portion are typically made of metal, such as stainless steel, titanium, aluminum, copper, brass and the like, and combinations thereof, for example, and the first and second radially outer vibration insulating sheath portions of the radially outer generally spool shaped vibration insulating sheath portion are typically formed of a vibration isolating elastomer such as fluorosilicone elastomer, silicone rubber, nitrile rubber, butyl rubber, and combinations thereof, and the like, for example.

These and other features and advantages of the present invention will become more apparent from the following detailed description of the invention in conjunction with the accompanying drawings, which illustrate, by way of example, the operation of the invention.

DETAILED DESCRIPTION OF THE PREFERRED EMBODIMENTS

Figure 1:
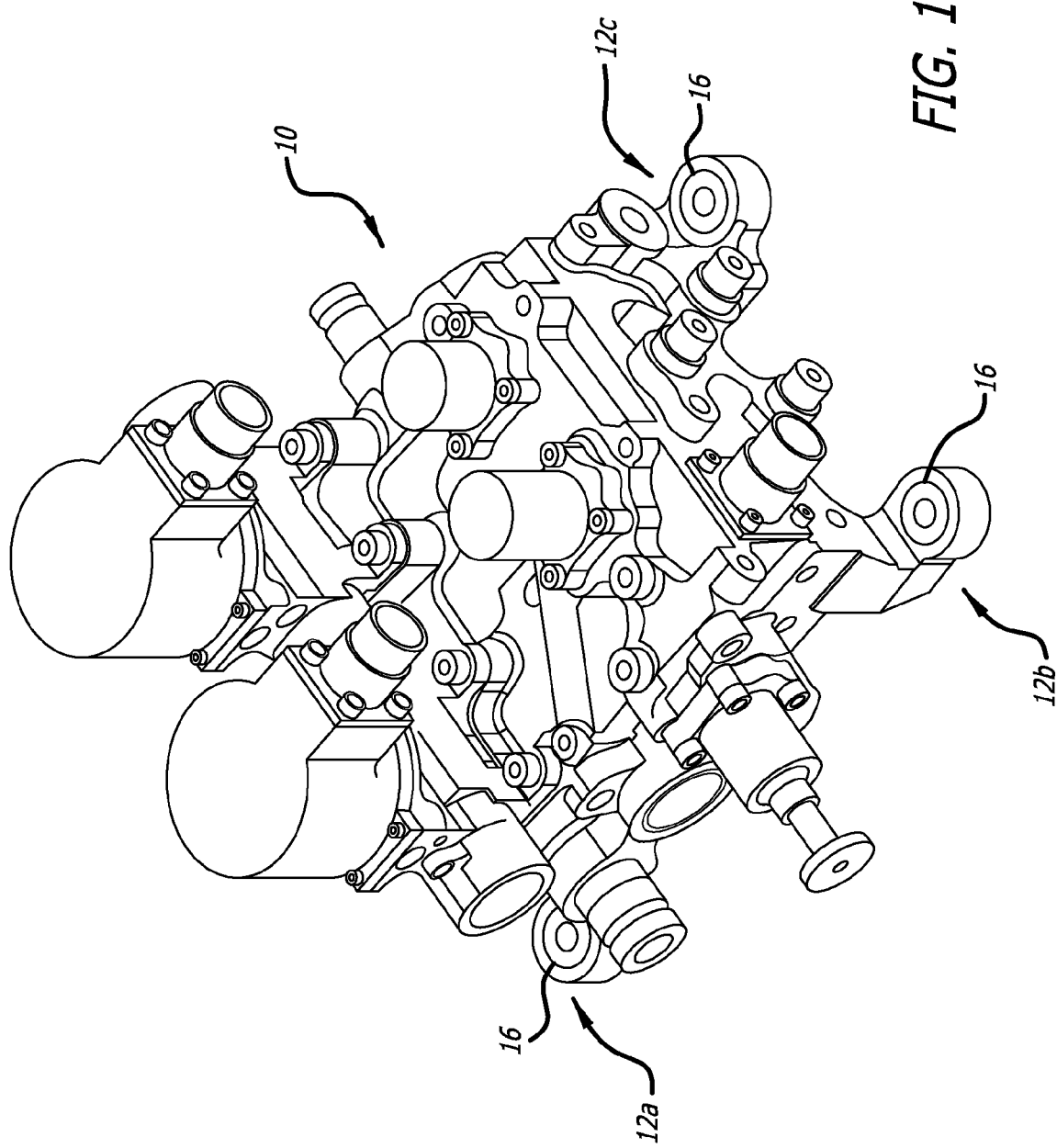
FIG. 1 is a perspective view of an aircraft brake control valve manifold with shock and vibration isolators installed in the mounting feet of the aircraft brake control valve manifold, according to the present invention, and showing servo-brake control valves, park brake and shutoff solenoids also assembled into the unit.
Figure 2:
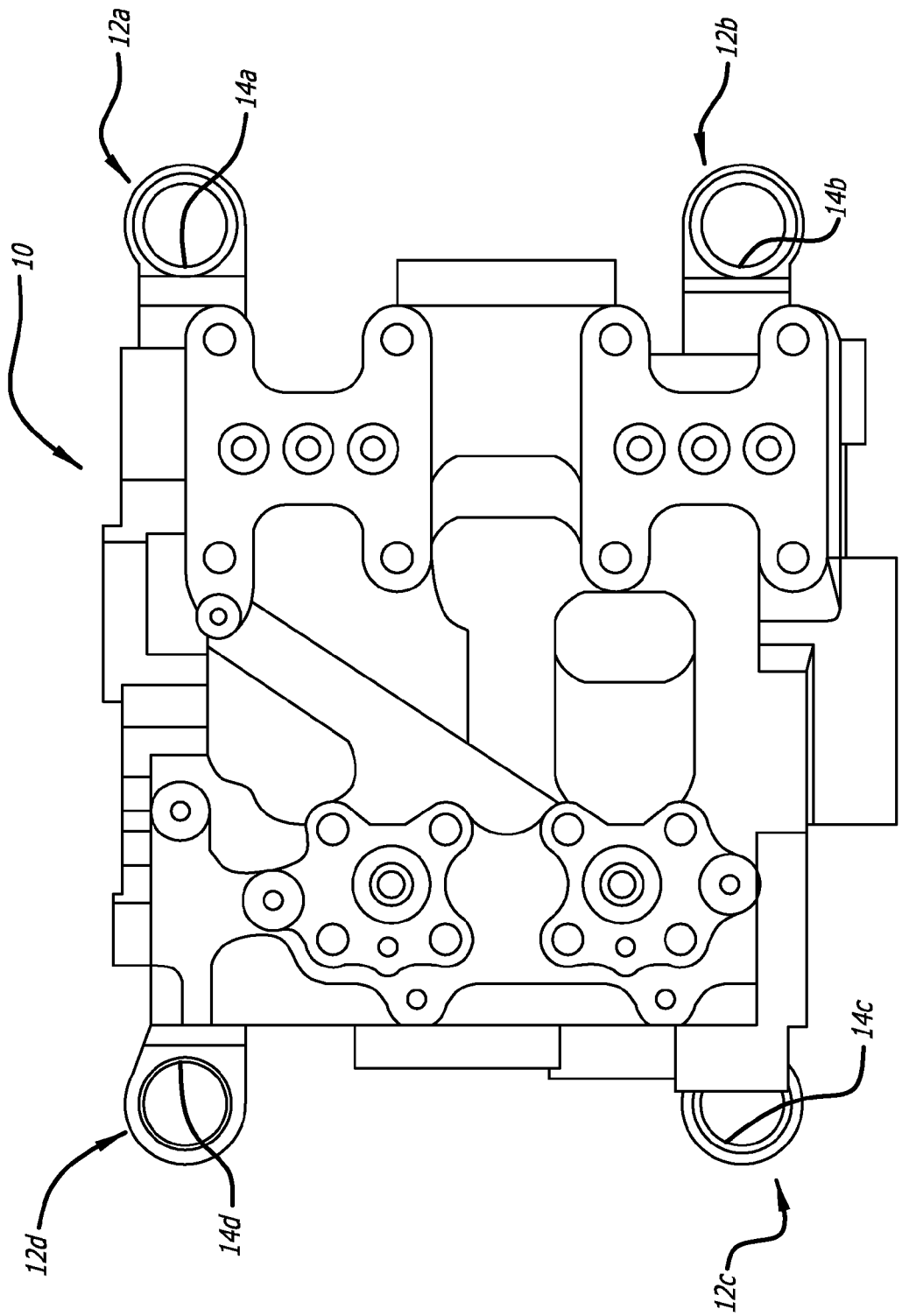
FIG. 2 is a top plan view of the aircraft brake control valve manifold of FIG. 1 with portions of the aircraft brake control valve manifold and shock and vibration isolators removed for clarity, showing the interior portions of the mounting feet of the aircraft brake control valve manifold, according to the present invention.
Figure 3:
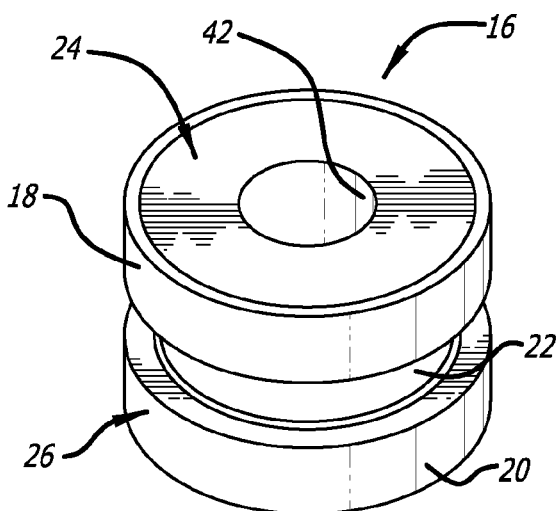
FIG. 3 is a perspective view of one of the shock and vibration isolators of FIG. 1, according to the present invention.
Figure 4:
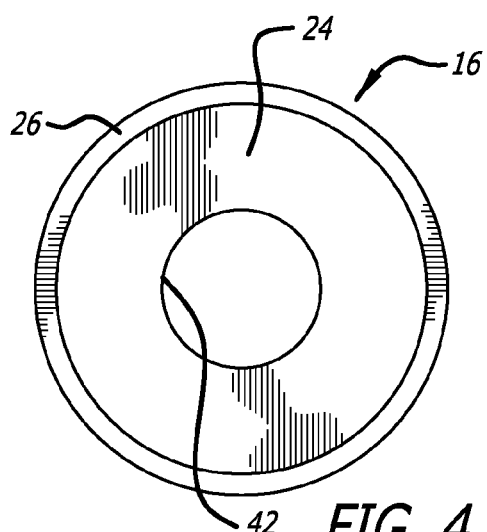
FIG. 4 is a top plan view of the shock and vibration isolator of FIG. 3.

Referring to the drawings, which are provided by way of example for purposes of illustration, and which are not intended to limit the scope of the invention, the present invention provides for an aircraft brake control valve manifold 10 including a plurality of mounting feet, such as four mounting feet 12a, 12b, 12c, 12d, for example, as illustrated in FIGS. 1 and 2, configured to be rigidly or hard mounted to a structural part of an aircraft (not shown), such as by bolts or other type of fasteners, for example. Each of the plurality of mounting feet typically has a corresponding generally cylindrical central mounting aperture 14a, 14b, 14c, 14d configured to receive and retain a shock and vibration isolator 16 assembled into the mounting aperture. The shock and vibration isolator of the invention advantageously has a preselected, predetermined natural frequency selected to protect one or more selected components of an aircraft brake control valve from random vibration and to avoid gun fire sinusoidal frequencies that can otherwise damage sensitive components of the brake control valve. In a presently preferred aspect, the natural frequency of the shock and vibration isolators is predetermined to be in a range to protect a sensitive flapper nozzle of the aircraft brake control valve from random vibration and to avoid gun fire sinusoidal frequencies, and is preferably below the natural frequency range of the flapper nozzle of the brake control valve, such as below 300 to 500 Hz, for example. In one presently preferred aspect, the natural frequency of the shock and vibration isolators of the present invention can be approximately 75.5 Hz, for example. As is further explained hereinbelow, each shock and vibration isolator has a central aperture configured to receive a fastener such as a bolt for hard mounting of the mounting feet of the brake control valve manifold to a structural part of the aircraft.

Figure 6:
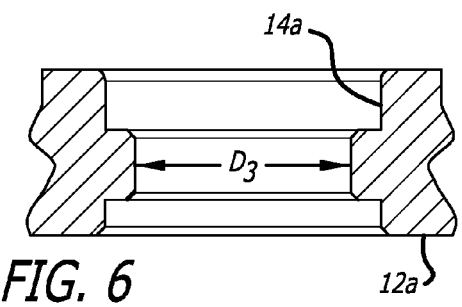
FIG. 6 is a cross-sectional view through a mounting aperture of a mounting foot of an aircraft brake control valve manifold.
Figure 7:
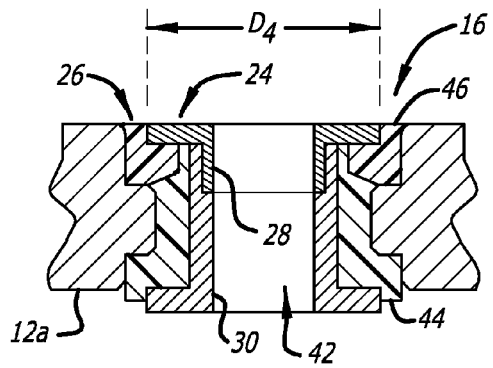
FIG. 7 is a cross-sectional view through the mounting aperture of a mounting foot of FIG. 6, showing a shock and vibration isolator assembled in the mounting aperture.
Figure 8:
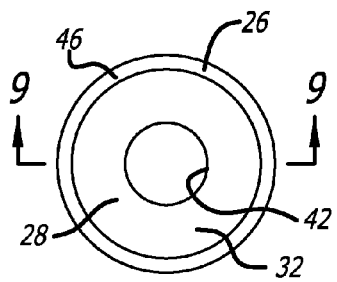
FIG. 8 is a top plan view of an upper portion of a shock and vibration isolator according to the present invention.
Figure 10:
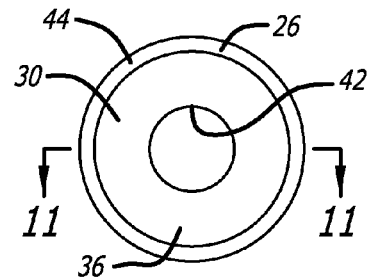
FIG. 10 is a bottom plan view of a lower portion of a shock and vibration isolator according to the present invention.
Figure 9:
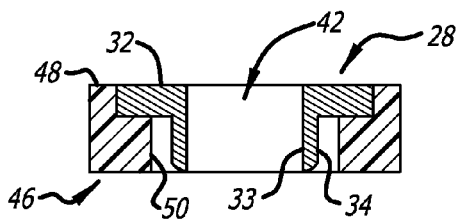
FIG. 9 is a cross-sectional view of the upper portion of the shock and vibration isolator taken along line 9-9 of FIG. 8.
Figure 11:
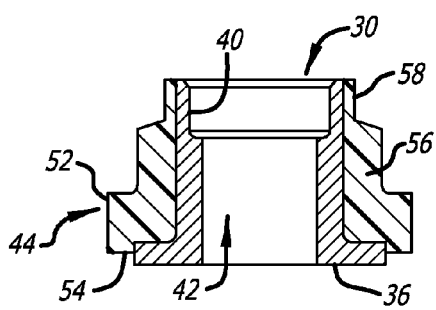
FIG. 11 is a cross-sectional view of the lower portion of the shock and vibration isolator taken along line 11-11 of FIG. 10.

Referring to FIGS. 3-5 and 7-11, in a presently preferred aspect, each shock and vibration isolator 16 is generally spool shaped, having a first or upper widened side 18 and a second or lower widened side 20 with an assembled height 21, and having a radially outer diameter $D_2$, and a narrower middle portion 22 having a radially outer diameter $D_1$. The shock and vibration isolator 16 includes a radially inner generally spool shaped rigid insert portion 24 and a radially outer generally spool shaped vibration insulating sheath portion or jacket 26. As is best seen in FIGS. 7, 9 and 11, the radially inner generally spool shaped rigid insert portion 24 is formed of a first or upper radially inner rigid tubular member 28 and a second or lower radially inner rigid tubular member 30 that overlaps and interfits with the first or upper radially inner rigid tubular member 28. The first or upper radially inner rigid tubular member 28 includes an upper radially outwardly flared annular end portion 32 and a lower tubular shaft portion 33 having a radially outer surface 34. The second or lower radially inner rigid tubular member 30 includes a lower radially outwardly flared annular end portion 36 and an upper flange 40 that can be assembled to overlap and interfit with the lower tubular shaft portion 33 of the first or upper radially inner rigid tubular member. The lower tubular shaft portion 33 and outer surface 34 of the lower tubular shaft portion can be matingly assembled into the upper flange 40; however, a threaded mating of these portions or a bonding interface between these portions may also be suitable. Referring to FIGS. 6 and 7, the internal diameter $D_3$ of the cylindrical mounting aperture 14 is preferably smaller than the external diameter $D_4$ of the upper radially outwardly flared annular end portion 32 and the lower radially outwardly flared annular end portion 36 that are part of the rigid insert portion 24, to prevent the shock and vibration isolator 16 from pulling out of the brake control manifold, thereby making the assembly of the shock and vibration isolators in the mounting feet of the brake control manifold fail safe.

The first or upper radially inner rigid tubular member 28 and the second or lower radially inner rigid tubular member 30 of the generally spool shaped rigid insert portion together define the central aperture 42 therethrough for receiving a fastener (not shown) such as a bolt for hard mounting of the mounting feet of the brake control valve manifold to a structural part of the aircraft. The first and second inner rigid tubular members 28, 30 forming the inner, generally spool shaped rigid insert portion are typically made of a rigid material such as a metal, such as 300 series stainless steel. The first and second inner rigid tubular members may also be formed from other types of stainless steel, titanium, aluminum, copper, brass and the like, and combinations thereof, for example, which may also be suitable for providing rigidity to the hard mounting, particularly when a bolt or other type of fastener is placed through the shock and vibration isolator and is tightened over the rigid tubular insert portion of the shock and vibration isolator.

The radially outer generally spool shaped vibration insulating sheath portion or jacket 26 is formed of a first or lower generally tubular radially outer vibration insulating sheath portion 44 and a second or upper generally tubular radially outer vibration insulating sheath portion 46 that overlaps and interfits with the first or lower generally tubular radially outer vibration insulating sheath portion 44. The second or upper generally tubular radially outer vibration insulating sheath portion 46 includes a radially outer tubular portion 48 and a radially inner annular portion 50. The first or lower generally tubular radially outer vibration insulating sheath portion 44 includes a lower radially outwardly flared end portion 52 with a lower lip portion 54 that extends over the lower radially outwardly flared end portion 36 of the second or lower radially inner rigid tubular member 30 of the radially inner generally spool shaped rigid insert portion 24, and an upper radially inner tubular shaft portion 56 having an upper radially inner flange 58 that is overlapped by and interfits with the radially inner annular portion 50 of the second or upper generally tubular radially outer vibration insulating sheath portion 46. The first or lower generally tubular radially outer vibration insulating sheath portion 44 is secured about the upper radially inner tubular shaft portion 38 and lower radially outwardly flared annular end portion of the second or lower radially inner rigid tubular member 30 of the generally spool shaped rigid insert portion 24, and the second or upper generally tubular radially outer vibration insulating sheath portion 46 is secured about the first or upper radially outwardly flared annular end portion 32 of the first or upper radially inner rigid tubular member 28. The first or lower generally tubular or annular outer vibration insulating sheath portion 44 and the second or upper generally tubular radially outer vibration insulating sheath portion 46 of the radially outer generally spool shaped vibration insulating sheath portion or jacket are typically formed of an elastomer such as fluorosilicone elastomer, silicone rubber, nitrile rubber, butyl rubber, and combinations thereof, and the like, for example.

Figure 5:
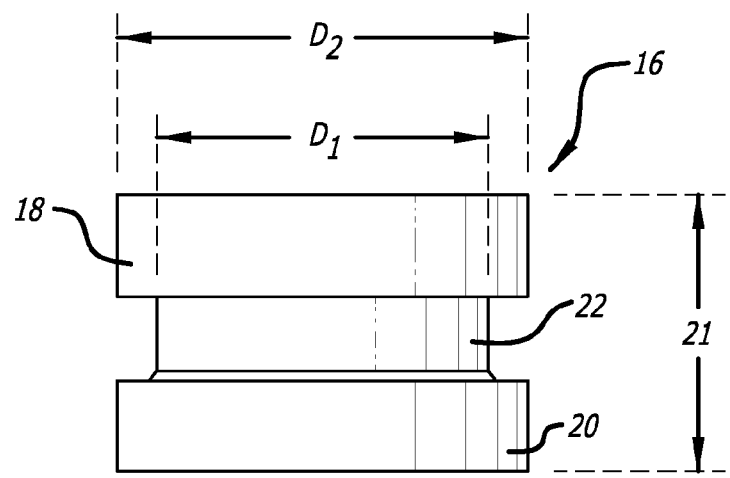
FIG. 5 is a side elevational view of the shock and vibration isolator of FIG. 3.

Referring to FIG. 5, the outside diameter $D_2$ of the shock and vibration isolator is dimensioned such that a bolt or other type of fastener placed through the central aperture of the rigid tubular insert portion will be spaced apart from the mounting foot in which the shock and vibration isolator is placed by the vibration insulating sheath portion or jacket, so that vibrations transmitted through the bolt or other type of fastener from the aircraft structural part or framework will be substantially isolated from the mounting feet of the manifold of the brake control valve. By this hard mounting configuration, vibrations transmitted through the bolt or other type of fastener from the aircraft structural part or framework can only be transmitted through the vibration insulating sheath portion or jacket portions of the shock and vibration isolators, and are damped due to the pre-selected, predetermined natural frequency of the shock and vibration isolators.

Figure 12:
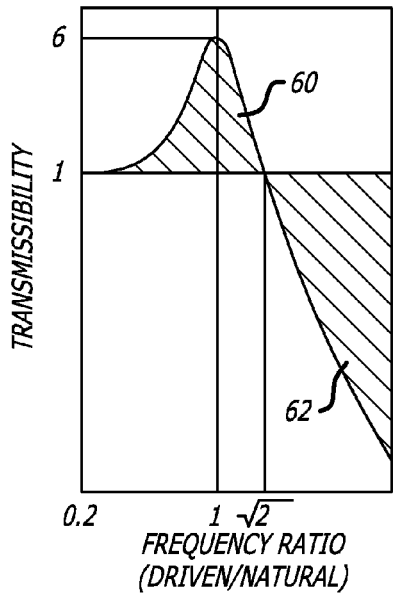
FIG. 12 is an illustration of a transmissibility curve for the shock and vibration isolators according to the invention placed in mounting feet of a manifold of a brake control valve.

The brake control valve shock and vibration isolation mounting system of the invention was tested in shock and random vibration environments, and was able to survive the full qualification duration without any measurable degradation of the flapper nozzle interface. FIG. 12 illustrates a transmissibility curve for the mounting of a manifold of a brake control valve having a part or component such as a flapper nozzle first stage that incorporates an armature with a natural frequency in the 300 to 500 Hz range, for protection against shock and vibration in this frequency range, by providing shock and vibration isolators according to the invention that can be incorporated in the mounting feet of the manifold. In general the natural frequency of the shock and vibration isolators must always be selected to be to be in a vibration attenuation region of isolation lower than the natural frequency of whatever part or component that must be protected from shock and vibration, such as a flapper nozzle, for example, although other similar parts or components with other natural frequencies for which the natural frequency of the shock and vibration isolators must be lower may also be suitable targets for protection from shock and vibration. In this example, the natural frequency of the shock and vibration isolators of the present invention were approximately 75.5 Hz in all axes, so that the maximum transmissibility in the region of amplification 60 was a maximum of 6.0, at the natural frequency of the shock and vibration isolators, and the transmissibility of the frequencies of concern in the range of 300 to 500 Hz is substantially minimized, falling well within the attenuation region of isolation 62 of the shock and vibration isolators.

It will be apparent from the foregoing that while particular forms of the invention have been illustrated and described, various modifications can be made without departing from the spirit and scope of the invention. Accordingly, it is not intended that the invention be limited, except as by the appended claims.

I claim:

1. A shock and vibration isolator for hard mounting an aircraft brake control valve to a structural part of an aircraft, comprising:
   a radially inner generally spool shaped rigid insert portion defining a central aperture configured to receive a fastener for hard mounting of the brake control valve to the structural part of an aircraft, wherein said radially inner generally spool shaped rigid insert portion includes a first radially inner rigid tubular member and a second radially inner rigid tubular member that overlaps and interfits with the first radially inner rigid tubular member, and said first radially inner rigid tubular member includes an upper radially outwardly flared annular end portion and a lower tubular shaft portion, and said second radially inner rigid tubular member includes a lower radially outwardly flared end portion and an upper flange that overlaps and interfits with the lower tubular shaft portion of the first radially inner rigid tubular member; and
   a radially outer generally spool shaped vibration insulating sheath portion, wherein said outer generally spool shaped vibration insulating sheath portion comprises a first generally tubular radially outer vibration insulating sheath portion and a second generally tubular radially outer vibration insulating sheath portion that overlaps and interfits with the first generally tubular outer vibration insulating sheath portion;
   wherein said shock and vibration isolator has a natural frequency selected to protect a component of the aircraft brake control valve from damage from shock and vibration.

2. The shock and vibration isolator of claim 1, wherein the natural frequency of the shock and vibration isolator is predetermined to be below a natural frequency of the component of the brake control valve to protect the component of the brake control valve from shock and vibration.

3. The shock and vibration isolator of claim 2, wherein the component of said brake control valve is a flapper nozzle, and the natural frequency of the shock and vibration isolator is selected to be approximately 75.5 Hz.

4. The shock and vibration isolator of claim 1, wherein said first radially inner rigid tubular member and said second inner rigid tubular member of the generally spool shaped rigid insert portion together define said central aperture therethrough.

5. The shock and vibration isolator of claim 1, wherein said first and second radially inner rigid tubular members are made of metal.

6. The shock and vibration isolator of claim 5, wherein said metal is selected from the group consisting of stainless steel, titanium, aluminum, copper, brass, and combinations thereof.

7. The shock and vibration isolator of claim 1, wherein said second generally tubular radially outer vibration insulating sheath portion includes a radially outer tubular portion and a radially inner annular portion, and said first generally tubular radially outer vibration insulating sheath portion includes a lower radially outwardly flared end portion with a lower lip portion that extends over the lower radially outwardly flared end portion of the second inner rigid tubular member of the radially inner generally spool shaped rigid insert portion, and said first generally tubular radially outer vibration insulating sheath portion includes an upper radially inner flange that is overlapped by and interfits with the radially inner annular portion of the second generally tubular outer vibration insulating sheath portion.

8. The shock and vibration isolator of claim 1, wherein said first generally tubular radially outer vibration insulating sheath portion is secured about the upper flange and lower radially outwardly flared annular end portion of the second radially inner rigid tubular member of the generally spool shaped rigid insert portion, and the second generally tubular radially outer vibration insulating sheath portion is secured about the upper radially outwardly flared annular end portion of the first radially inner rigid tubular member.

9. The shock and vibration isolator of claim 1, wherein said first generally tubular radially outer vibration insulating sheath portion and the second generally tubular radially outer vibration insulating sheath portion of the radially outer generally spool shaped vibration insulating sheath portion comprise an elastomer.

10. The shock and vibration isolator of claim 9, wherein said elastomer is selected from the group consisting of fluorosilicone elastomer, silicone rubber, nitrile rubber, butyl rubber, and combinations thereof.

11. The shock and vibration isolator of claim 1, wherein said shock and vibration isolator has a radially outer diameter that is dimensioned such that the fastener placed through the central aperture of the rigid tubular insert portion will be spaced apart from a mounting foot in which the shock and vibration isolator is placed by the vibration insulating sheath portion, wherein vibrations transmitted through the fastener from the aircraft structural part will be substantially isolated from the mounting feet of the manifold of the brake control valve.

12. A shock and vibration isolation mounting system for hard mounting an aircraft brake control valve to a structural part of an aircraft, the aircraft brake control valve including a component having at least one frequency of vibration, the shock and vibration isolation mounting system comprising:
an aircraft brake control valve manifold, said manifold including a plurality of mounting feet configured to be hard mounted to a structural part of an aircraft, each of said plurality of mounting feet having a central mounting aperture configured to receive and retain a shock and vibration isolator;
a shock and vibration isolator disposed in each said central aperture of each of said plurality of mounting feet, each said shock and vibration isolator including a radially inner generally spool shaped rigid insert portion and a radially outer generally spool shaped vibration insulating sheath portion; and
wherein each said shock and vibration isolator has a natural frequency predetermined to be below a natural frequency of the component of the brake control valve to protect the component of the brake control valve from random vibration and to avoid gun fire sinusoidal frequencies.

13. The shock and vibration isolation mounting system of claim 12, wherein said inner generally spool shaped rigid insert portion comprises a first radially inner rigid tubular member and a second inner rigid tubular member that overlaps and interfits with the first radially inner rigid tubular member.

14. The shock and vibration isolation mounting system of claim 13, wherein said first radially inner rigid tubular member and said second inner rigid tubular member of the generally spool shaped rigid insert portion together define a central aperture therethrough for receiving a fastener for hard mounting of the mounting feet of the brake control valve manifold to a structural part of the aircraft.

15. The shock and vibration isolation mounting system of claim 13, wherein said first and second inner rigid tubular members are made of stainless steel.

16. The shock and vibration isolation mounting system of claim 15, wherein said first and second radially inner rigid tubular members are made of a metal selected from the group consisting of stainless steel, titanium, aluminum, copper, brass, and combinations thereof.

17. The shock and vibration isolation mounting system of claim 12, wherein said outer generally spool shaped vibration insulating sheath portion comprises a first generally tubular radially outer vibration insulating sheath portion and a second generally tubular radially outer vibration insulating sheath portion that overlaps and interfits with the first generally tubular outer vibration insulating sheath portion.

18. The shock and vibration isolation mounting system of claim 17, wherein said first generally tubular radially outer vibration insulating sheath portion and said second generally tubular radially outer vibration insulating sheath portion of the radially outer generally spool shaped vibration insulating sheath portion comprise an elastomer.

19. The shock and vibration isolation mounting system of claim 18, wherein said elastomer is selected from the group consisting of fluorosilicone elastomer, silicone rubber, nitrile rubber, butyl rubber, and combinations thereof.

20. The shock and vibration isolation mounting system of claim 12, wherein said shock and vibration isolator has a radially outer diameter that is dimensioned such that a fastener placed through the central aperture of the rigid tubular insert portion will be spaced apart from the mounting foot in which the shock and vibration isolator is placed by the vibration insulating sheath portion, wherein vibrations transmitted through the fastener from the aircraft structural part will be substantially isolated from the mounting feet of the manifold of the brake control valve.

21. The shock and vibration isolation mounting system of claim 12, wherein the component of the brake control valve is a flapper nozzle, and the natural frequency of the shock and vibration isolators is selected to be approximately 75.5 Hz.

* * * * *